US012656457B2

(12) United States Patent
Küchler et al.

(10) Patent No.: US 12,656,457 B2
(45) Date of Patent: Jun. 16, 2026

(54) METHOD OF OPERATING A PULSED RADAR DEVICE AND PULSED RADAR DEVICE

(71) Applicant: NXP B.V., Eindhoven (NL)

(72) Inventors: Wolfgang Küchler, Graz (AT); David Lugitsch, Graz (AT)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 18/653,825

(22) Filed: May 2, 2024

(65) Prior Publication Data

US 2024/0369683 A1 Nov. 7, 2024

(30) Foreign Application Priority Data

May 3, 2023 (EP) ..................................... 23171375

(51) Int. Cl.
G01S 7/41 (2006.01)
G01S 13/87 (2006.01)
H04L 25/02 (2006.01)
(52) U.S. Cl.
CPC ................. G01S 7/41 (2013.01); G01S 13/87 (2013.01); H04L 25/0212 (2013.01)

(58) Field of Classification Search
CPC ......... G01S 7/41; G01S 13/87; H04L 25/0212
See application file for complete search history.

(56) References Cited

U.S. PATENT DOCUMENTS

| | | | | |
|---|---|---|---|---|
| 6,639,537 B1 * | 10/2003 | Raz | ..................... | H03M 1/0626 |
| | | | | 341/143 |
| 2018/0254925 A1 * | 9/2018 | Dutz | .................... | H04B 1/7183 |
| 2022/0128678 A1 | 4/2022 | Kareem et al. | | |
| 2023/0080019 A1 | 3/2023 | Kuchler et al. | | |

* cited by examiner

*Primary Examiner* — Ladimir Magloire
*Assistant Examiner* — Eric K Hodac

(57) ABSTRACT

A radar system can improve performance by estimating a channel impulse response (CIR) in a way that accounts for noise arising from asymmetric interference. The system transmits a first channel-sounding sequence (CSS) that includes a first pulses and a second CSS that includes second pulses. The second pulses are complements of the first pulses. A first CIR corresponding to the first CSS and a second CIR corresponding to the second CSS are combined to produce an overall CIR that reduces or eliminates arte-facts caused by asymmetric interference.

12 Claims, 6 Drawing Sheets a)

b)

100

110

120

200

210

230

220

METHOD OF OPERATING A PULSED RADAR DEVICE AND PULSED RADAR DEVICE

CROSS-REFERENCE TO RELATED APPLICATIONS

This application claims priority under 35 U.S.C. § 119 to European patent application no. 23171375.1, filed May 3, 2023, the contents of which are incorporated by reference herein.

TECHNICAL FIELD

The present disclosure relates to a method of operating a pulsed radar device. Furthermore, the present disclosure relates to a pulsed radar device. Furthermore, the present disclosure relates to computer implemented methods for carrying out the proposed method.

BACKGROUND

UWB radar applications are becoming ubiquitous (e.g. for object, gesture and vital sign detection). Competitive solutions have to offer high sensitivity in a small formfactor and at a low cost. Well known ultrawideband (UWB) radar applications use sounding sequences with ideal autocorrelation properties to sound the channel. A receiver of said UWB radar employs a correlator to generate a channel impulse response (CIR) by means of correlation the received reflection (echo) with the sent channel sounding sequence. These known channel sounding methods work well, as long as distortions in the transceiver of the UWB radar are symmetric. Asymmetric distortions are, however, unavoidable in practical implementations.

SUMMARY

It is thus an object to provide an improved pulsed radar device.

According to a first aspect of the present disclosure there is provided a method to operate a pulsed radar device, comprising the steps:
- a) transmitting of at least a channel sounding sequence with deflections and complementary deflections to essentially the same extent, wherein the deflections are sent together with the complementary deflections or wherein the deflections are sent separately from the complementary deflections;
- b) coherent accumulation of received channel sounding sequences, having been reflected on at least one target; and
- c) generating at least a channel impulse response, CIR, as a result of the coherent accumulation of step b).

In this way artefacts (e.g. DC-offsets of a receiving unit of the pulsed radar device) have little or no impact to the generation of CIRs. As a consequence CIRs can be better identified and an improved pulsed radar device is provided. Consequently, also weak targets can be detected and a complexity of the pulsed radar device may be reduced. In other words, a sensitivity of the pulsed radar device may be improved in this way. If more than one channel sounding sequence are used to generate a CIR, a pause between the channel sounding sequence transmissions is technically useful to avoid ambiguity in the target distance.

According to a further aspect there is provided a pulsed radar device, comprising:

a transmitting unit adapted to perform transmitting channel sounding sequences as specified in any of the preceding claims;

a receiving unit adapted to perform receiving reflected channel sounding sequences as specified in any of the preceding claims; and a CIR generation unit adapted to perform generating CIRs as specified in any of the preceding claims.

According to a further aspect, there is provided a computer implemented method comprising executable instructions which, when executed by a transmitting unit of a pulsed radar device cause said transmitting unit to carry out the proposed method.

According to a further aspect, there is provided a computer implemented method comprising executable instructions which, when executed by a receiving unit and a CIR generation unit of a pulsed radar device cause said receiving unit and said CIR generation unit to carry out the proposed method.

According to one or more embodiments, an integral of all channel sounding sequencies used to generate a CIR is minimized, preferably marginally different from zero.

According to one or more embodiments, the channel sounding sequence comprises a first channel sounding sequence and a second channel sounding sequence, wherein the second channel sounding sequence is transmitted concurrently with the first channel sounding sequence or wherein the second channel sounding sequence is transmitted afterwards, at earliest after a specified pause duration after the first channel sounding sequence.

According to one or more embodiments, the pause duration between the channel sounding sequences is at least as long as a duration needed to receive reflections from a most distant target by means of the pulsed radar device.

According to one or more embodiments, the channel sounding sequence is transmitted with symbols and complementary symbols to essentially the same extent.

According to one or more embodiments, a guard symbol is inserted between symbols and complementary symbols. Between the symbols are thus inserted pause times, wherein autocorrelation characteristics may be improved. Artefacts can thus be eliminated or at least reduced.

According to one or more embodiments, the channel sounding sequence comprises symbols with shifted complementary symbols. In this way, only a single channel sounding sequence has to be transmitted. Sensed raw data may be processed by the receiving unit.

According to one or more embodiments, the channel sounding sequence comprises modulated symbols. In this way, only a single channel sounding sequence has to be transmitted. After demodulation, data may be processed by the receiving unit. Whether a symbol in the channel sounding sequence is a "regular" or a complementary symbol is determined by the modulation code.

According to one or more embodiments, the first channel sounding sequence is combined with a cyclically shifted version of the complementary channel sounding sequence, creating a combined channel sounding sequence, and sent together as one channel sounding sequence. Also in this case a single channel sounding sequence is transmitted and a final CIR is determined, which may be done offline.

According to one or more embodiments, the method comprises the steps:

receiving reflected channel sounding sequence reflected at at least one target;

processing the received reflected channel sounding sequence and generating first and second channel impulse responses, and generating a third channel impulse response out of the first and second channel impulse responses.

According to one or more embodiments, a reflected first channel sounding sequence is received and a first channel impulse response is generated, wherein a reflected second channel sounding sequence is received and a second channel impulse response is generated, wherein a third channel impulse response is generated out of the first channel impulse response and the second channel impulse response.

According to one or more embodiments, the first and second channel impulse responses are generated in one of the following ways:

accumulating of the received channel sounding sequences within the transmitted channel sounding sequence period;

correlating of transmitted and received channel sounding sequences;

using of unprocessed channel sounding sequences.

In this way, the first and second channel impulse responses may be generated in different ways, e.g. by averaging, e.g. over a period of symbols or pulses of the channel sounding sequences. Alternatively, the CIRs may be built by unedited channel sounding sequences.

BRIEF DESCRIPTION OF DRAWINGS

The proposed methods may cancel CIR artefacts caused by asymmetric distortion within a receiver of the pulse radar device. This may result in reduced costs and/or a reduced formfactor of the proposed pulsed radar device.

The aspects defined above and further aspects of the present disclosure are apparent from the examples of embodiment to be described hereinafter with reference to the appended drawings, which are explained with reference to the examples of embodiment. However, the disclosure is not limited to the examples of embodiment.

Figures 1, 2:
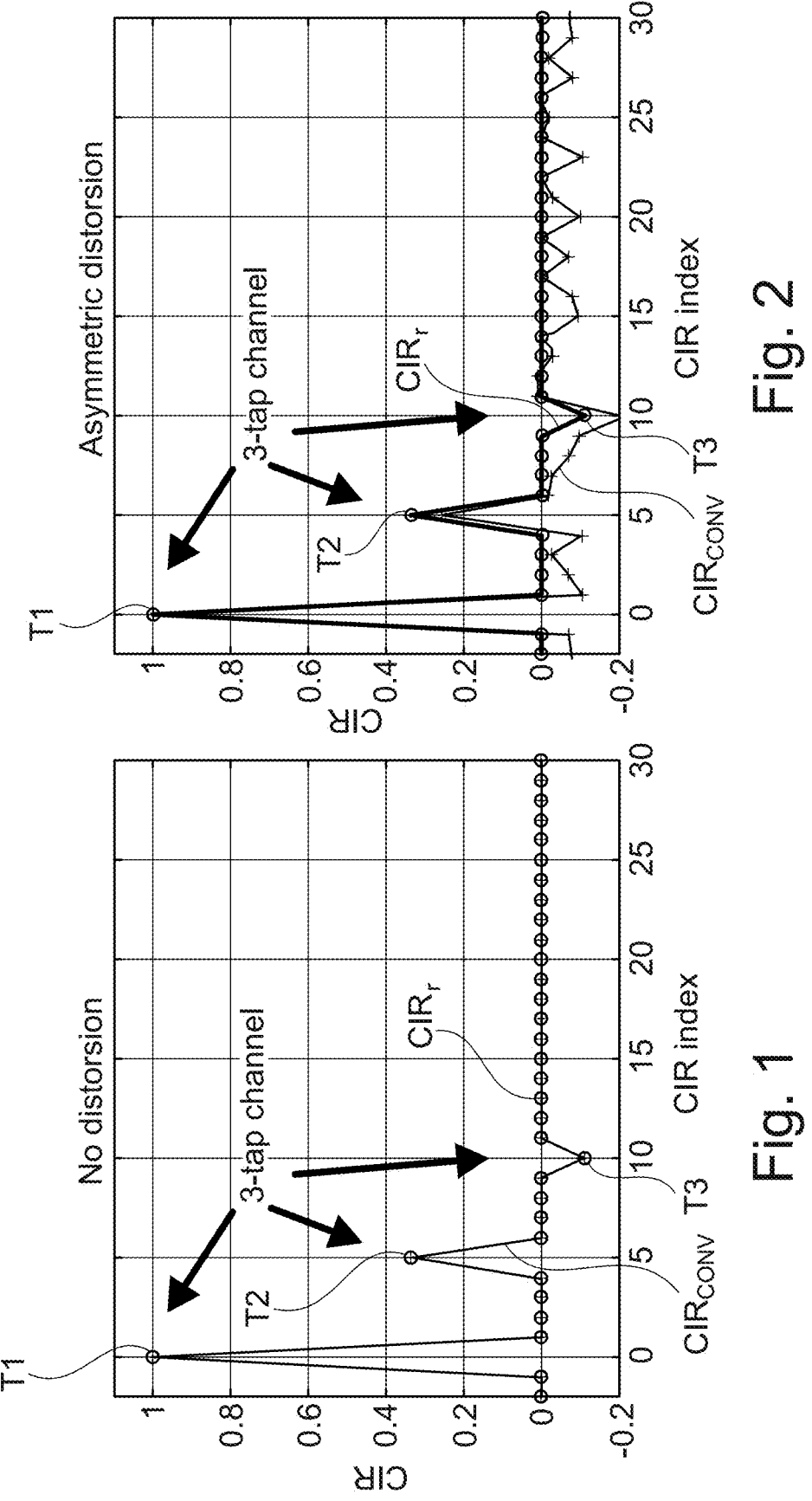

All illustrations in the drawings are schematical. It is noted, that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 4:
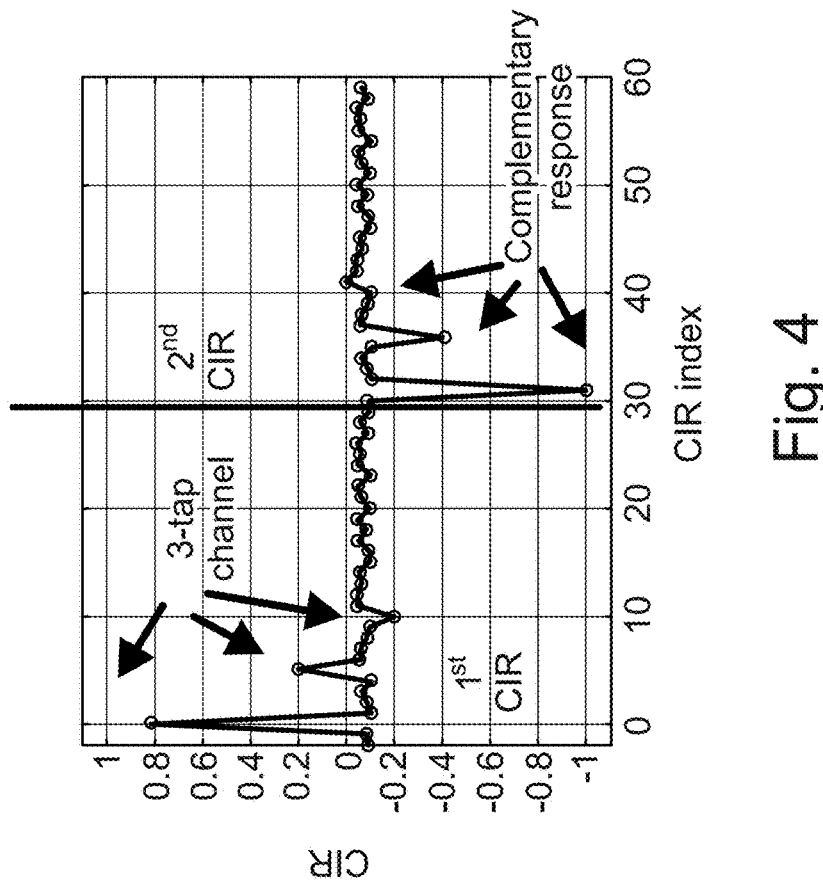
Figure 3:
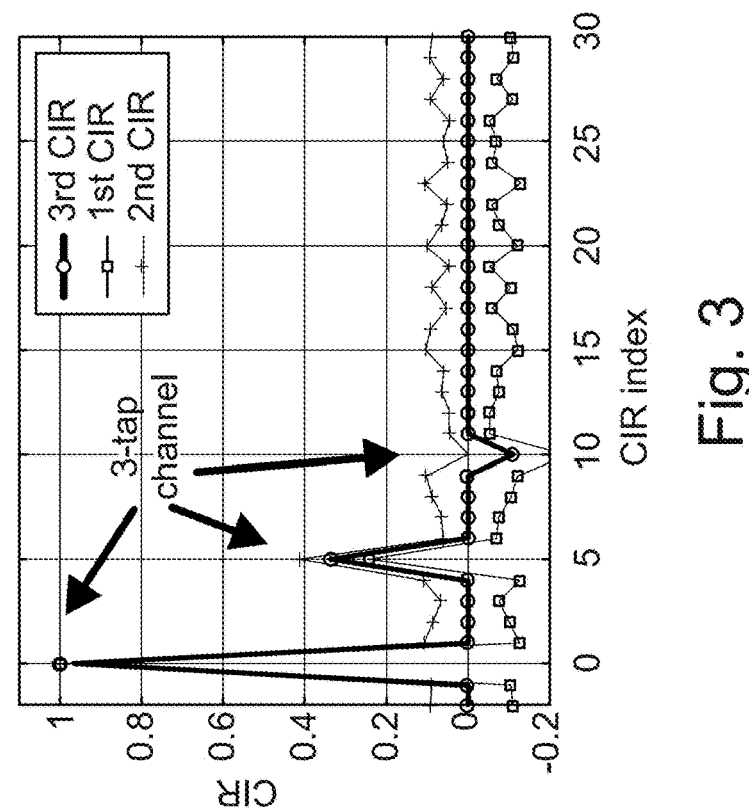
Figure 6:
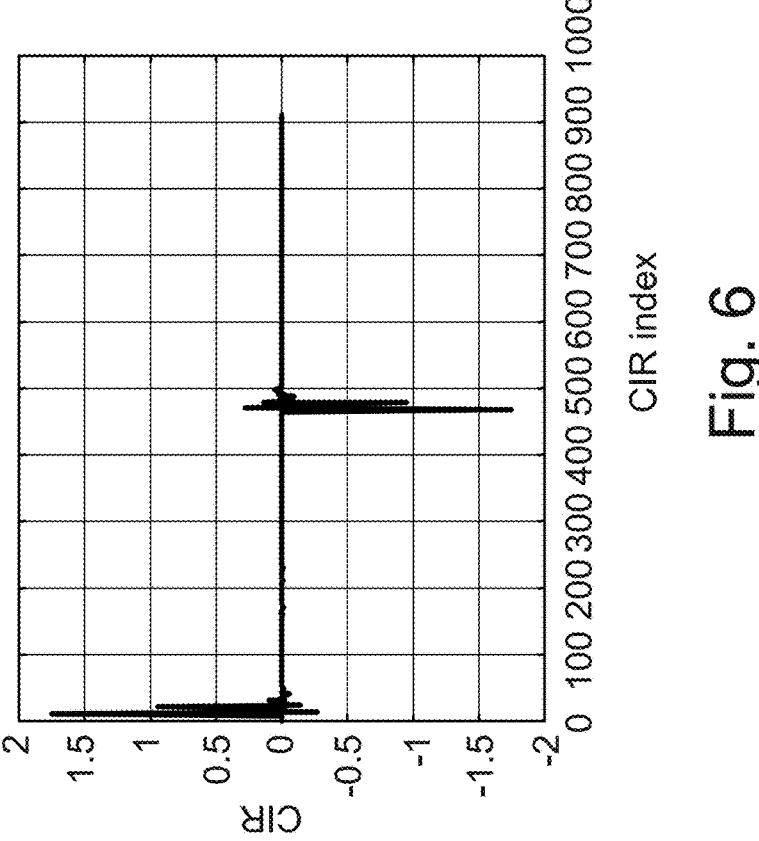
Figure 5:
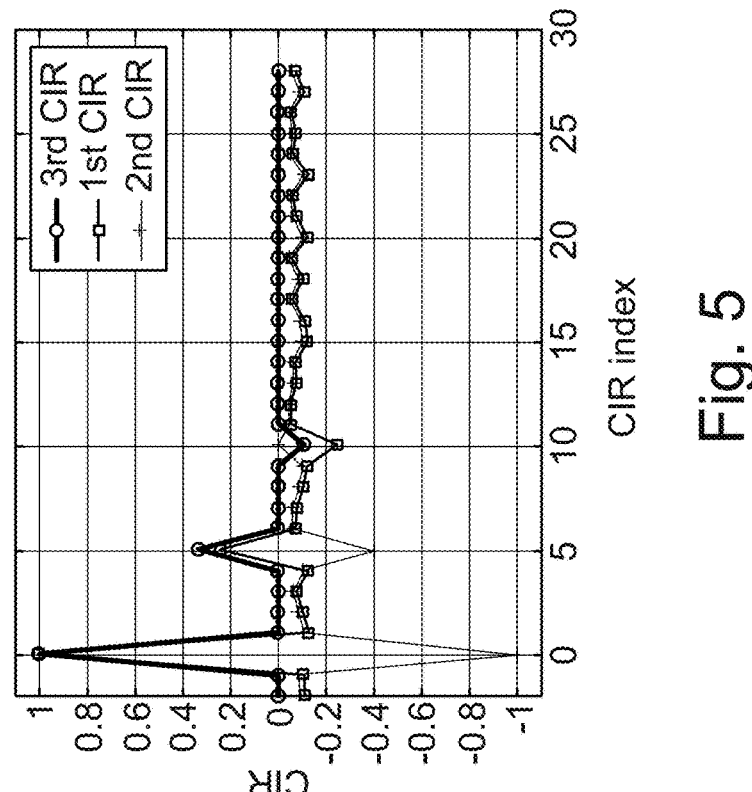
Figure 8:
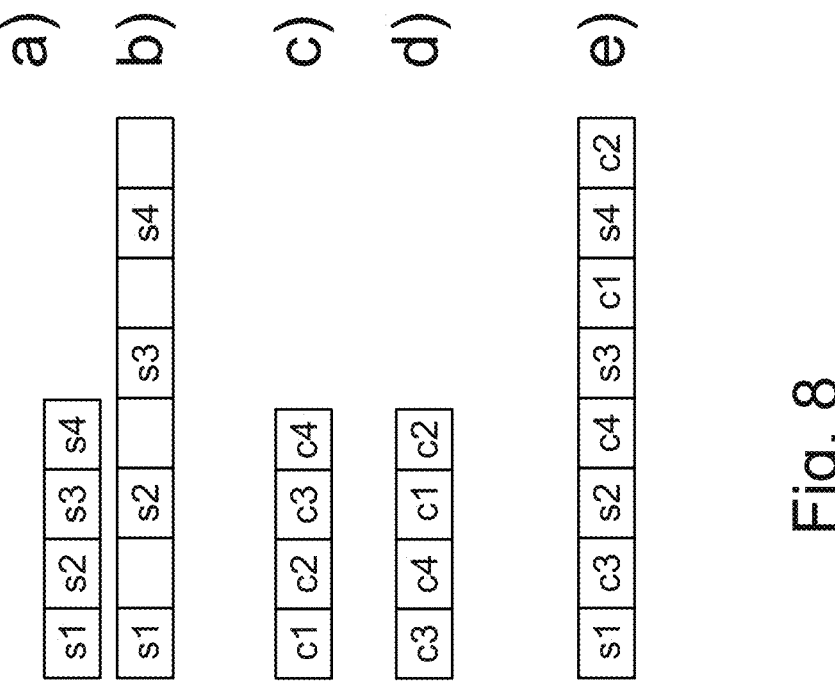
Figure 7:
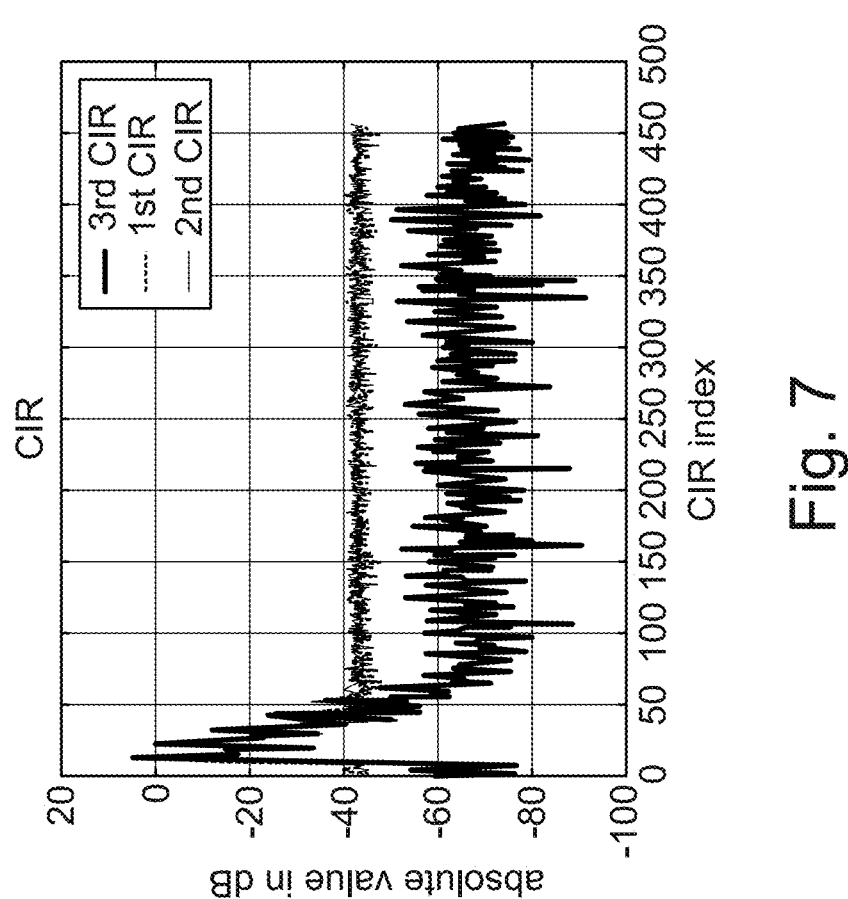
Figure 9:
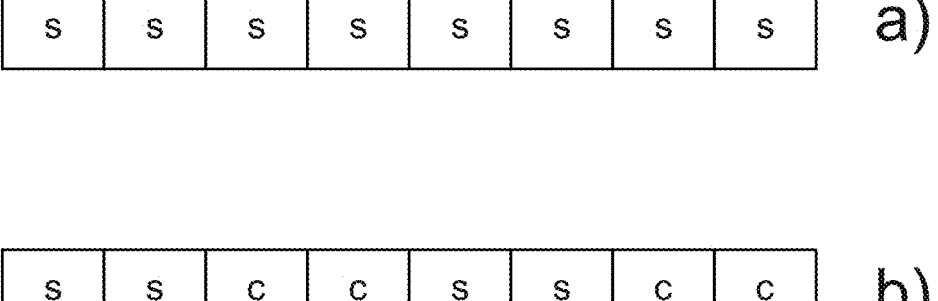
Figure 10:
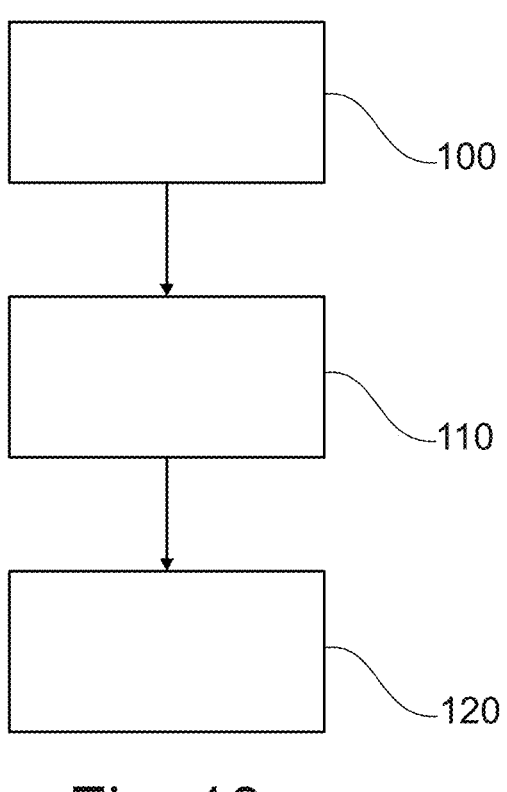
Figure 11:
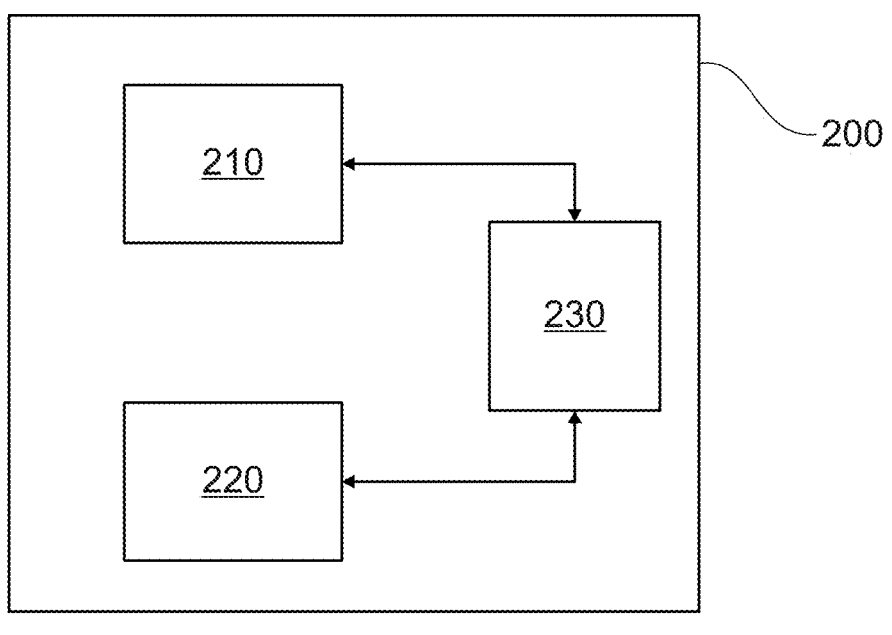

FIG. 1 shows a conventional CIR of a 3 tap channel with no distortion;

FIG. 2 shows a conventional CIR of a 3 tap channel with an asymmetric distortion;

FIG. 3 shows a CIR of a 3 tap channel with an asymmetric distortion as generated by means of the proposed method;

FIG. 4 shows a CIR of a 3 tap channel generated with a first CIR and a second CIR;

FIG. 5 shows the first CIR and the second CIR from FIG. 4 lying on top of each other and a third CIR generated by means of the proposed method;

FIG. 6 shows a result of a measurement with a proposed pulsed radar device;

FIG. 7 shows a result of a measurement with a proposed pulsed radar device generating three CIRs;

FIG. 8 shows methods to generate channel sounding sequences for the proposed method;

FIG. 9 shows further methods to generate channel sounding sequences for the proposed method;

FIG. 10 shows a flow diagram of the proposed method of operating a pulsed radar device; and FIG. 11 shows a block diagram of a proposed pulsed radar device.

DESCRIPTION OF EMBODIMENTS

The present disclosure proposes methods to operate a pulsed radar device with a transmitting unit and a receiving unit, sending, receiving and evaluating specific channel sounding sequences which are able to minimize artefacts of the receiving unit of the pulsed radar device.

In the following, a "channel sounding sequence" is meant as a pulse train of either single pulses, multiple pulses, single symbols or multiple symbols. Or the channel sounding sequence it consists of a "regular" and a complementary channel sounding sequence. However, it is not influenced by the unknown channel which is intended to be measured.

In the following, the term "complementary" with respect to channel sounding sequences of pulsed radar devices means that the complementary channel sounding sequences and the "regular" channel sounding sequences together have an identical number of positive or negative deflections.

In the following, "sensed raw data" is the channel sounding sequence influenced by the unknown channel, influenced by the echoes of the targets. Synonyms for sensed raw data are for example: received channel sounding sequence, received data, reflected channel sounding sequence, received signal, received echoes of the channel sounding sequence, received channel sounding sequence, reflected data, reflected channel sounding sequence, received signal.

In the following, the term "deflection" means a single pulse, several deflections form a symbol and one to many symbols form a channel sounding sequence. Deflections are always sent one after each other.

A channel impulse response (CIR) is the final result, which represents a detected target or multiple detected targets. It is calculated from the sensed raw data by knowing the used channel sounding sequence.

In the following, a "channel sounding sequence" can also be seen as a "packet". A "cyclic transmitting of at least a symbol" means a special case of a packet.

In the following, a channel sounding sequence also may comprise symbols, wherein every symbol comprises several pulses. However, also other kinds of positive and negative deflections of channel sounding sequences are possible, with the premise that the "regular" channel sounding sequence and the complementary channel sounding sequency together have an identical number of positive and negative deflections. It is also conceivable to use more than two (number N) channel sounding sequences with the property that all N channel sounding sequences together have an identical number of positive and negative deflections. The general property is that the integral over the N sequences is zero. This also covers multi-valid sequences and any other combinations. A final CIR is then calculated from all N channel sounding sequences.

A CIR generation unit processes the received signals together with the sent signals in order to generate CIRs. The receiver combines all CIRs to cancel the artefacts caused by asymmetric distortion.

Referring to FIG. 1 now, there are shown CIRs of an exemplary 3-tap channel with three targets T1, T2, T3, i.e. a radar channel with three reflectors or radar targets T1, T2, T3. A CIRr of the 3 tap channel has been generated by means of the proposed method and a CIRconv of the 3 tap channel has been generated by means of a conventional method. In FIG. 1 no distortion is present, and both methods perform equally well. The distortion is usually not in the channel, it is in the transmitting signal or in the receiving device used to measure the channel.

In contrast thereto, severe asymmetric distortion is present as shown in FIG. 2. One recognizes, that this may have a severe impact on the conventional method and creates a noise floor in the CIRconv, in this way overshadowing in particular the third tap T3 ("correlation artefacts") of the 3 tap channel. As a result, the target T3 is widely superimposed by artefacts and cannot be identified in the CIRconv. Weak targets can thus be more or less invisible in the noise. In UWB radar, targets by themselves are rather weak and can thus difficult to be detected (e.g. detection of breathing patterns of people, etc.).

By means of the proposed method of operating a pulsed radar device asymmetric distortions do not impact the CIR, whereby the taps remain clearly recognizable.

Referring to CIRs shown in FIG. 3, a first embodiment of the proposed method works as follows:

1. A first channel sounding sequence (not shown) is transmitted by a transmitting unit of the pulsed radar device and sensed raw data are correlated with the first channel sounding sequence by the receiving unit of the pulsed radar device, wherein a first CIR is created by a CIR generation unit (not shown) of the pulsed radar device. It can be seen that the asymmetric distortion creates a noise floor within the first CIR.

2. A second complementary channel sounding sequence (not shown) is transmitted by the transmitting unit of the pulsed radar device and sensed raw data are correlated with the second complementary channel sounding sequence by the receiving unit, wherein a second CIR is created by the CIR generation unit (not shown) of the pulsed radar device. It can be seen, that the asymmetric distortion and the complementary channel sounding sequence creates a complementary noise floor within the second CIR compared to the first CIR.

3. The first and second CIRs are added coherently to create a third CIR. It can be seen, that the coherent addition of the first and second CIR cancels the CIR artefacts caused by the asymmetric distortion of the receiver of the pulsed radar device. Therefore, advantageously, no more noise floor is present in the third CIR.

A pulsed radar device (e.g. UWB radar device) transmits cyclically multiple UWB channel sounding sequences with a defined repetition period. In general, the duration of a channel sounding sequence can be shorter than the repetition period of the channel sounding sequence. This can lead to a pause between channel sounding sequences. Each channel sounding sequence consists of multiple symbols and one symbol consists of multiple pulses.

In this embodiment of the proposed method it is assumed that the final CIR (third CIR) is calculated from two subsequent channel sounding sequences each defined with a complementary channel sounding sequence. Between the first and second channel sounding sequences is a transmission and/or receiving pause period PD, which is at least as long as the period of a symbol of the channel sounding sequence. This supports that the unambiguous distance, defined by the symbol period is still valid.

Alternatives to generate the first and second CIR by means of the proposed method work as follows:

(i) The first and second CIR is the result of an accumulation of the sensed raw data within the symbol period and the correlation of the sensed raw data with the channel sounding sequence. The order of the calculation steps does not matter.

(ii) The first and second CIR is the result of an accumulation of the sensed raw data within the symbol period.

(iii) The first and second CIR is the result of a correlation of the channel sounding sequence.

(iv) The first and second CIR area built by unprocessed sensed raw data

In an alternative, any number of channel sounding sequencies are received to build any number of CIRs, wherein a final channel impulse response is generated out of the individual channel impulse responses. E.g. the first channel sounding sequence is transmitted with transmit power 2 and then two complementary channel sounding sequences are transmitted with transmit power 1, resulting in a final CIR=CIR1+ (CIR2+CIR3).

A further embodiment of the proposed method of operating a pulsed radar device works as shown in FIG. 4.

A channel sounding sequence is combined with a cyclically shifted version of the complementary channel sounding sequence, in this way creating a combined channel sounding sequence, as explained below in more detail in the context with FIG. 8.

The combined channel sounding sequence is transmitted by the transmitter and sensed raw data are correlated by the receiver of the pulsed radar device with the up-sampled original channel sounding sequence shown in FIG. 8*b*), in this way creating a combined received CIR. The correlation creates one single response for the channel sounding sequence and one complementary shifted response.

The first CIR (shown in the left section of FIG. 4) is calculated by using the first part of the combined CIR. A second CIR (shown in the right section of FIG. 4) is calculated by using the second part of the combined CIR. A $3^{rd}$ CIR (final CIR) is built via the following subtraction:

$$3^{rd}\ CIR = 1^{st}\ CIR - 2^{nd}\ CIR$$

This coherent subtraction may cancel the CIR artefacts caused by the asymmetric distortion in the receiver of the pulsed radar device.

FIG. 5 shows the same circumstances as FIG. 4, wherein the first and second CIRs are plotted on top of each other, resulting in the third CIR (final CIR), which advantageously is free of artefacts.

With the combined sequence, both sequences from the first embodiment (original channel sounding sequence plus afterwards sent complementary channel sounding sequence) are united in one single channel sounding sequence.

Calculation steps as described above with respect to FIG. 4 and FIG. 5 can be combined in one process step as shown in FIG. 6. In this combined process step the sensed raw data is correlated with the combined channel sounding sequence and not the original one. In other words, the received echoes are correlated with the combined channel sounding sequence. This results in a CIR that is twice the sounded channel (echoes, reflections), exactly complementary to each other. The asymmetric distortions (e.g. artefacts of the receiving unit of the pulsed radar device) are widely cancelled, as indicated in the FIG. 6, which shows such a CIR as a result of a measurement with a proposed pulsed radar device. The right and left section of FIG. 6 are identical except for the signs. That means only one section of the FIG.

6 is needed for a measurement with the pulsed radar device, wherein the other section can be discarded, because its content is identical.

FIG. 7 shows the individual CIRs as described in the context of FIG. 4 and shows on the y-axis absolute values in dB. One recognizes, that the first and second CIRs are heavily influenced by a DC-offset. This can be cancelled by the subtraction CIR1−CIR2. A corresponding simulation is shown in the diagram of FIG. 5.

The final (artefact-free) CIR is built as a result of a correlation of the combined channel sounding sequence with the sensed raw data. Alternatively, it could be a correlation of the up-sampled original channel sounding sequence shown in FIG. 8 b) with the sensed raw data with a subsequent extraction of the two CIRs and subtraction. Optionally, an accumulation of the channel sounding sequence is possible if the channel sounding sequence consists of multiple symbols. If so, all the symbols in the channel sounding sequence can be accumulated to one symbol to gain SNR. The order of the calculation steps does not matter.

FIG. 8 shows in several representations a calculation of the combined channel sounding sequence. The original channel sounding sequence is shown in FIG. 8a) and is represented by a perfect periodic autocorrelation sequence with pulses s1 . . . s4. This sequence is characterized by the fact, that it has perfect auto-correlation characteristics. However, also alternative sequences can be used in this context.

A complementary channel sounding sequence c as defined above is built by the following mathematical operation:

$$c = -s$$

FIG. 8b) shows in principle an up-sampled original channel sounding sequence with pulses s1 . . . s4, wherein one blanks between the pulses s1 . . . s4 are recognizable. s1, s2, s3, s4 are single pulses. The final sequence shown in FIG. 8e) can be interpreted as a symbol that can be repeatedly transmitted. That the smallest unit is the pulse, wherein a pulse can be either +1, 0 or −1.

In general, it is also conceivable that the pulse is multi-valued, e.g. by changing the transmit power for each pulse. A symbol is the union of several pulses. The reason to define a symbol is because it has special properties. E.g. perfect autocorrelation property. The symbol shown in FIG. 8a) has the perfect cyclic autocorrelation property. The symbol shown in FIG. 8e) has additionally the "same number of positive and negative pulses" property which is the invention. A channel sounding sequence is the largest unit. It consists of either a single pulse, multiple pulses, a single symbol or multiple symbols.

The RX must know how a channel sounding sequence is assembled in order to calculate a CIR.

FIG. 8c) shows the complementary channel sounding sequence with the pulses c1 . . . c4.

FIG. 8d) shows the complementary circular shifted channel sounding sequence with the pulses c1 . . . c4 in the order: c3, c4, c1, c2.

FIG. 8e) shows the combined channels sounding sequence of the up sampled original channel sounding sequence of FIG. 8b) and the complementary circular shifted channel sounding sequence of FIG. 8d).

Advantageously, as shown in FIG. 8, the complementary channel sounding sequence with the pulses c1 . . . c4 are shifted by the half sequence length for the generation of the combined sequence, wherein into resulting voids complementary symbols are inserted. Also other kinds of shifting operations are possible.

A further alternative of generating channel sounding sequences is shown in FIG. 9. The polarity of the symbols/pulse in a channel sounding sequence is modulated with a code. This polarity code should be balanced, i.e. the polarity of the symbols is modulated in such a way, that the same number of symbols in a channel sounding sequence has a positive and a negative polarity. This results in the same number of positive as negative pulses in a channel sounding sequence.

In the following, a complimentary symbol c of a symbol s is built in the following way:

$$c=-s$$

FIG. 9a) shows a normal channel sounding sequence built as a periodic continuation of the same symbol s or the same pulse.

FIG. 9b) shows an exemplary modulated channel sounding sequence, wherein the modulation code is [1, 1, −1, −1, 1, 1 . . . ].

At a receiving unit of the pulsed radar device (not shown), after asymmetric disturbances having happened, the polarity of channel sounding sequence is demodulated. After this step, all symbols/pulses have the same polarity. Then, the demodulated channel sounding sequence is correlated with the channel sounding sequence and accumulated, wherein an order of said calculation steps does not matter.

As a result, the artefact cancellation happens at the accumulation. In an optional step, whenever there is a polarity change in the modulation code, the following symbol/pulse can be ignored for accumulation. This ensures that echoes are not accumulated with wrong polarity. In other words, an inter symbol interference (ISI) can be largely avoided.

An alternative way to avoid inter symbol interference is to insert a guard symbol into the channel sounding sequence every time a polarity change is made. This can e.g. be done with a ternary modulation code, e.g. shown as follows:

[1, 0, −1, 0, 1, 0, −1, −1, −1, 0, 1, 1, 1]

The corresponding demodulation code may look like as follows:

[1, 1, −1, −1, 1, 1, −1, −1, −1, −1, 1, 1, 1]

FIG. 10 shows a flow diagram of the proposed method to operate a pulsed radar device.

In a step 100 there is performed a transmitting of at least a channel sounding sequence with deflections and complementary deflections to essentially the same extent, wherein the deflections are sent together with the complementary deflections or wherein the deflections are sent separately from the complementary deflections.

In a step 110 there is performed a coherent accumulation of received channel sounding sequences, having been reflected on at least one target T1 . . . . Tn.

In a step 120 there is generated at least a channel impulse response as a result of the cyclic coherent accumulation of step 110.

FIG. 11 shows a block diagram of a proposed pulsed radar device. One recognizes a transmitting unit 210 adapted to cyclically transmit a first channel sounding sequence S1 and for cyclically transmitting a second channel sounding sequence S2. A receiving unit 220 is operatively coupled to the transmitting unit 210 and adapted to receive channel impulse responses of the channel sensing sequences. A CIR generation unit 230 can be part of the receiving unit 220 or can be built as a separate unit (as shown in FIG. 11) and is adapted to generate channel impulse responses, CIR, from echoes of the transmitted channel sounding sequences. The receiving unit 220 and the transmitting unit 210 can also be arranged in separated units (multistatic radar, not shown).

An accumulation of channel sounding sequences can be performed in the receiving unit 220. In order to improve a signal-to-noise ratio (SNR), symbols of channel sounding sequences are averaged or accumulated over the symbol period. A correlation of channel sounding sequences must be matched with the transmitting unit 210. By means of a CIR generation unit 230 CIRs are generated in the above described ways.

In order to provide the pause duration PD, pseudo-symbols without content (Guard symbol) can be transmitted. Alternatively, an echo of a channel sounding sequence can be ignored for a defined period of time. In this way, echo signals can be assigned to channel sounding sequences, wherein an accurate generation of CIRs is supported.

The present disclosure proposes a transmitter of a pulsed radar device, which transmits a channel sounding sequence, which enables a receiver of the pulsed radar device to cancel CIR artefacts caused by asymmetric distortions within the receiver. The proposed method cancels the artefacts caused by asymmetric distortions and can improve a sensitivity of the pulse based radar and/or supports a simpler construction of the pulse based radar which can results in cost advantages.

The previous disclosure has exemplary been explained in the context of a UWB radar device. However, the proposed method and devices are applicable for all types of pulsed radar devices. Therefore, the skilled person will recognize that the same or a slightly modified principle can be used for any pulse-based radar system, e.g. IR-UWB, etc.

The proposed method can be implemented at least partially as a software which can be stored in a computer readable memory or at least partially as a firmware or at least partially as a hardware.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semi-conductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document. Moreover, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

REFERENCE NUMERALS

100 . . . 120 method steps
200 pulsed radar device
210 transmitting unit
220 receiving unit
230 CIR generation unit
CIR channel impulse response
CIRr regular CIR
CIRconv conventional CIR
S1 $1^{st}$ channel sounding sequence
S2 $2^{nd}$ channel sounding sequence
PD pause duration
T1 . . . . Tn target
The invention claimed is:

1. A method of operating a pulsed radar device, the method comprising:

transmitting a first channel sounding sequence (CSS) comprising first pulses and transmitting a second CSS comprising second pulses, wherein the second pulses are complements of the first pulses;

receiving reflections of the first CSS from one or more objects and reflections of the second CSS from the one or more objects; and calculating an overall channel impulse response (CIR) using the reflections of the first CSS and the reflections of the second CSS, wherein calculating the overall CIR comprises:

calculating a first CIR using the first reflections;

calculating a second CIR using the second reflections; and generating the overall CIR by combining the first CIR with the second CIR, wherein combining the first CIR with the second CIR at least partially cancels asymmetric distortion of the first CSS and the second CSS present in the first CIR and the second CIR.

2. The method of claim 1, wherein transmission of the first CSS is separated by transmission of the second CSS by a pause duration.

3. The method of claim 2, wherein the pause duration between first CSS and the second CSS is at least as long as a duration needed to receive reflections from a most distant target by means of the pulsed radar device.

4. The method of claim 3, wherein, during transmission of the first CSS and the second CSS, the first pulses are interleaved with the second pulses.

5. The method of claim 4, wherein a guard symbol is inserted between symbols belonging to the first pulses and complementary symbols belonging to the second pulses.

6. The method of claim 1, wherein the first CSS is combined with a cyclically shifted version of the second CSS, creating a combined CSS and that is transmitted as a single CSS.

7. A pulsed radar device, comprising:

processing circuitry;

transmitter circuitry coupled to the processing circuitry; and receiver circuitry coupled to the processing circuitry;

wherein the processing circuitry is configured to:

transmit, using the transmitter circuitry, a first channel sounding sequence (CSS) comprising first pulses and transmitting a second CSS comprising second pulses, wherein the second pulses are complements of the first pulses;

receive, using the transmitter circuitry, reflections of the first CSS from one or more objects and reflections of the second CSS from the one or more objects; and calculate an overall channel impulse response (CIR) using the reflections of the first CSS and the reflections of the second CSS, wherein calculating the overall CIR comprises:

calculating a first CIR using the first reflections;

calculating a second CIR using the second reflections; and generating the overall CIR by combining the first CIR with the second CIR, wherein combining the first CIR with the second CIR at least partially cancels asymmetric distortion of the first CSS and the second CSS present in the first CIR and the second CIR.

8. The pulsed radar device of claim 7, wherein transmission of the first CSS is separated by transmission of the second CSS by a pause duration.

9. The pulsed radar device of claim 8, wherein the pause duration between first CSS and the second CSS is at least as long as a duration needed to receive reflections from a most distant target by means of the pulsed radar device.

10. The pulsed radar device of claim 7, wherein, during transmission of the fist CSS and the second CSS, the first pulses are interleaved with the second pulses.

11. The method of claim 10, wherein a guard symbol is inserted between symbols belonging to the first pulses and complementary symbols belonging to the second pulses.

12. The pulsed radar device of claim 7, wherein the first CSS is combined with a cyclically shifted version of the second CSS, creating a combined CSS and that is transmitted as a single CSS.

* * * * *